United States Patent
Maw et al.

(10) Patent No.: US 10,508,493 B2
(45) Date of Patent: Dec. 17, 2019

(54) UNIVERSAL JOINT

(71) Applicant: Ulterra Drilling Technologies, L.P., Fort Worth, TX (US)

(72) Inventors: Jason Maw, Beaumont (CA); Beau J. St. Pierre, Hudson Oaks, TX (US); Christopher M. Casad, Benbrook, TX (US)

(73) Assignee: Ulterra Drilling Technologies, Fort Worth, TX (US)

( * ) Notice: Subject to any disclaimer, the term of this patent is extended or adjusted under 35 U.S.C. 154(b) by 204 days.

(21) Appl. No.: 15/195,915

(22) Filed: Jun. 28, 2016

(65) Prior Publication Data
US 2017/0023068 A1     Jan. 26, 2017

Related U.S. Application Data

(60) Provisional application No. 62/196,630, filed on Jul. 24, 2015.

(51) Int. Cl.
| | | |
|---|---|---|
| *E21B 4/02* | (2006.01) | |
| *E21B 4/00* | (2006.01) | |
| *F16H 57/01* | (2012.01) | |
| *F16H 1/28* | (2006.01) | |

(52) U.S. Cl.
CPC ............. *E21B 4/02* (2013.01); *E21B 4/006* (2013.01); *F16H 1/28* (2013.01); *F16H 2057/012* (2013.01)

(58) Field of Classification Search
CPC . E21B 4/006; E21B 4/02; F16D 3/185; F16H 1/28; F16H 2057/012
See application file for complete search history.

(56) References Cited

U.S. PATENT DOCUMENTS

| | | |
|---|---|---|
| 763,127 A | 6/1904 | Tilden |
| 1,261,962 A | 4/1918 | Scott |
| 1,314,990 A | 9/1919 | Stockwell |
| 1,324,063 A | 12/1919 | Noel |
| 1,355,516 A | 10/1920 | Rodolphe |
| 1,362,646 A | 12/1920 | Stockwell |
| 1,373,393 A | 3/1921 | Langworthy |
| 1,376,504 A | 5/1921 | Behn |
| 1,421,072 A | 6/1922 | Emet |
| 1,422,339 A | 7/1922 | Church |
| 1,460,594 A | 7/1923 | Le Moon |
| 1,479,755 A | 1/1924 | Stokes |
| 1,488,291 A | 3/1924 | Schell |

(Continued)

FOREIGN PATENT DOCUMENTS

| | | |
|---|---|---|
| CH | 241255 | 2/1946 |
| DE | 163221 | 9/1905 |

(Continued)

OTHER PUBLICATIONS

Final Office Action received from the U.S. Patent and Trademark Office in U.S. Appl. No. 14/838,155, dated Jul. 5, 2017, 7 pages.

(Continued)

*Primary Examiner* — Michael R Wills, III
(74) *Attorney, Agent, or Firm* — Kilpatrick Townsend & Stockton LLP

(57) ABSTRACT

A universal joint for use in a downhole drill string includes a planetary gear to convert eccentric rotation in the drill string to axial rotation.

17 Claims, 5 Drawing Sheets

(56) References Cited

U.S. PATENT DOCUMENTS

| | | | |
|---|---|---|---|
| 1,550,458 | A | 8/1925 | Schell |
| 1,653,995 | A | 12/1927 | English |
| 1,739,756 | A | 12/1929 | Granville |
| 2,025,825 | A | 12/1935 | Louis |
| 2,217,969 | A | 10/1940 | Schairer |
| 2,301,659 | A | 11/1942 | Louis |
| 2,319,027 | A | 5/1943 | Aker |
| 2,491,820 | A | 12/1949 | Leibing et al. |
| 2,647,380 | A | 8/1953 | Henry et al. |
| 3,118,159 | A | 1/1964 | Kollmann |
| 3,203,285 | A | 8/1965 | Schmidt |
| 3,497,083 | A | 2/1970 | Anderson et al. |
| 3,757,879 | A | 9/1973 | Wilder et al. |
| 3,895,502 | A | 7/1975 | Schwarz |
| 4,055,966 | A | 11/1977 | Fredericks |
| 4,233,820 | A | 11/1980 | Driver |
| 4,449,956 | A | 5/1984 | Ueno |
| 4,706,659 | A | 11/1987 | Matthews et al. |
| 4,947,942 | A | 8/1990 | Lightle et al. |
| 4,982,801 | A | 1/1991 | Zitka et al. |
| 5,000,723 | A | 3/1991 | Livingstone |
| 5,019,015 | A | 5/1991 | Wasserfuhr |
| 5,048,622 | A | 9/1991 | Ide |
| 5,053,687 | A | 10/1991 | Merlet |
| 5,651,737 | A | 7/1997 | Blanc |
| 5,740,699 | A | 4/1998 | Ballantyne et al. |
| 6,155,349 | A | 12/2000 | Robertson et al. |
| 6,173,794 | B1 * | 1/2001 | von Gynz-Rekowski ............ E21B 4/006 175/106 |
| 6,220,372 | B1 | 4/2001 | Cherry |
| 6,415,735 | B1 * | 7/2002 | Rogers ............ F16D 3/185 116/208 |
| 6,676,526 | B1 | 1/2004 | Poster |
| 6,896,473 | B2 | 5/2005 | Schuler |
| 7,004,843 | B1 | 2/2006 | Kerstetter |
| 7,100,238 | B2 | 9/2006 | McCauley |
| 7,367,772 | B2 | 5/2008 | Khajepour et al. |
| 7,549,467 | B2 * | 6/2009 | McDonald ............ E21B 4/006 166/105 |
| 8,123,644 | B2 * | 2/2012 | Marumoto ............ F16H 13/06 475/194 |
| 8,251,938 | B1 | 8/2012 | Morcuende et al. |
| 8,317,628 | B2 | 11/2012 | Overfelt |
| 8,602,127 | B2 * | 12/2013 | Hummes ............ E21B 4/02 175/106 |
| 8,714,245 | B2 * | 5/2014 | Sihler ............ E21B 4/006 166/255.2 |
| 2011/0129375 | A1 * | 6/2011 | Kotsonis ............ E21B 4/02 418/4 |
| 2014/0027185 | A1 | 1/2014 | Menger et al. |
| 2015/0075871 | A1 * | 3/2015 | Strittmatter ............ E21B 4/006 175/106 |
| 2015/0129311 | A1 * | 5/2015 | Regener ............ E21B 3/00 175/61 |
| 2016/0060970 | A1 | 3/2016 | Pierre et al. |
| 2016/0341255 | A1 | 11/2016 | Kummer et al. |
| 2016/0356319 | A1 | 12/2016 | Chase et al. |
| 2017/0002871 | A1 | 1/2017 | McMillan et al. |
| 2017/0081928 | A1 | 3/2017 | Maw et al. |
| 2017/0328416 | A1 | 11/2017 | Maw et al. |
| 2017/0370420 | A1 | 12/2017 | Deen et al. |

FOREIGN PATENT DOCUMENTS

| | | | |
|---|---|---|---|
| DE | 2730486 | A1 | 1/1979 |
| EP | 0048564 | A2 | 3/1982 |
| FR | 485872 | A | 2/1918 |
| GB | 15259 | | 8/1890 |
| GB | 189619223 | | 8/1897 |
| RU | 2017930 | C1 | 8/1994 |
| RU | 2526957 | C1 | 8/2014 |
| SU | 700710 | | 11/1979 |

OTHER PUBLICATIONS

Final Office Action received from the U.S. Patent and Trademark Office in U.S. Appl. No. 15/160,809, dated Aug. 30, 2017, 12 pages.
International Search Report and Written Opinion received from the International Search Authority in Patent cooperation Treaty Application No. PCT/US2015/047387, dated Dec. 10, 2015, 8 pages.
Non-Final Office Action received from the U.S. Patent and Trademark Office in U.S. Appl. No. 14/838,155, dated Feb. 17, 2017, 9 pages.
Non-Final Office Action received from the U.S. Patent and Trademark Office in U.S. Appl. No. 15/160,809, dated Dec. 14, 2016, 18 pages.
Non-Final Office Action received from the U.S. Patent and Trademark Office in U.S. Appl. No. 15/195,892, dated Oct. 6, 2017, 9 pages.
Request for Continued Examination and Amendment filed with the U.S. Patent and Trademark Office in U.S. Appl. No. 14/838,155, dated Jan. 4, 2018, 9 pages.
Response to Non-Final Office Action filed with the U.S. Patent and Trademark Office in U.S. Appl. No. 14/838,155, dated Jun. 9, 2017, 6 pages.
Response to Non-Final Office Action filed with the U.S. Patent and Trademark Office in U.S. Appl. No. 15/160,809, dated Jun. 14, 2017, 17 pages.
Response to Restriction Requirement filed with the U.S. Patent and Trademark Office in U.S. Appl. No. 14/838,155, dated Jan. 26, 2017, 1 page.
Restriction Requirement received from the U.S. Patent and Trademark Office in U.S. Appl. No. 14/838,155, dated Oct. 26, 2016, 7 pages.
Request for Continued Examination and Amendment filed with the U.S. Patent and Trademark Office in U.S. Appl. No. 15/160,809, dated Feb. 28, 2018, 14 pages.
U.S. Appl. No. 15/160,809, "Final Office Action" dated Jan. 18, 2019, 30 pages.
U.S. Appl. No. 15/160,809, "Non-Final Office Action" dated Mar. 21, 2018, 19 pages.
U.S. Appl. No. 15/195,892, "Final Office Action" dated Jul. 12, 2018, 11 pages.
U.S. Appl. No. 15/195,892, "Notice of Allowance" dated Feb. 13, 2019, 6 pages.
U.S. Appl. No. 15/160,809 , "Non-Final Office Action", dated May 10, 2019, 13 pages.
U.S. Appl. No. 15/636,469 , "Non-Final Office Action", dated May 20, 2019, 10 pages.

* cited by examiner

UNIVERSAL JOINT

FIELD OF THE INVENTION

This invention relates to universal joints for drill string.

GENERAL BACKGROUND

Universal joints transmit torque where there can be misalignment of two components. In a drilling operation, a drill bit is mounted to the end of a drill string. The drill string is rotated from the top of the string or by a motor at the bottom of the string, or both, to rotate the drill bit and advance the borehole. Universal joints are included in the drill string to accommodate eccentricity in the string. The eccentric rotation is converted into axial rotation in order for the drill bit to advance the borehole efficiently. Eccentricity may be initiated by a motor in the drive assembly that rotates the drill bit or by steering of the bit to change direction of the borehole or other operating conditions.

FIG. 1 is a schematic representation of a drilling operation 2 to advance a borehole 4. The drill string 6 comprises sections of pipe that are threaded together at their ends to create a pipe of sufficient length to reach the bottom of the wellbore 4. The drill string is rotated in the bore either by a motor 22 proximate to the bit 8 at the end of the drill string or by rotating the drill string or both simultaneously. The drill string may be several miles long. A pump circulates drilling fluid through the drill pipe and out of the drill bit flushing rock cuttings from the bit and transporting them back up the wellbore. Additional tools can be added to the drill string for specific functions such as vibrating the drill string to reduce friction, downhole measurement or steering.

Mud motors are often used at the lower end of the drill string to rotate the bit. The motors have a rotor in a housing that rotates in response to the flow of drilling fluid. Universal joints are generally used to link the motor to the drill bit and convert eccentric rotation of the mud motor shaft to axial rotation. The constant relative movement of the components of the universal joint, in abrasive drilling mud, causes abrasion and erosion of mating components and can limit operational life of drill string components.

SUMMARY OF THE INVENTION

The present invention pertains to the use of gears in a downhole universal joint. In our embodiment, the gears are used to connect a mud motor to a drill bit. In one construction, a planetary gear assembly is used as part of a downhole drill string. The assembly functions as a universal joint to transmit torque between adjacent rotating components with shafts that may be not completely aligned. The assembly uses a planetary gear system to convert eccentric rotation to axial rotation. The gears can engage adjacent gears with corresponding teeth or can use magnetic force or friction between adjacent gears to transmit torque. A planetary gear system can provide a compact assembly that allows the components of the drill string to be positioned closer together shortening the drill string.

In one aspect of the present invention, a universal joint assembly for downhole applications includes a ring gear engaging a planetary gear to rotate a sun gear about a longitudinal axis. The assembly connects to components or tools of a drill string to transmit torque.

In another aspect of the invention, a driven gear with eccentric rotation drives a central gear with axial rotation connected to a downhole tool for advancing a borehole.

In another aspect of an embodiment of the invention, the gears engage each other by teeth on the rim of one gear. In another embodiment of the invention the gears engage each other by magnetic force. In another embodiment of the invention the assembly includes a flaccid line. In another embodiment of the invention the assembly includes a flex disc. In another embodiment of the invention the planetary gears are used in conjunction with a positive displacement motor or a rotational impulse tool.

DETAILED DESCRIPTION OF THE PREFERRED EMBODIMENT

Figure 1:
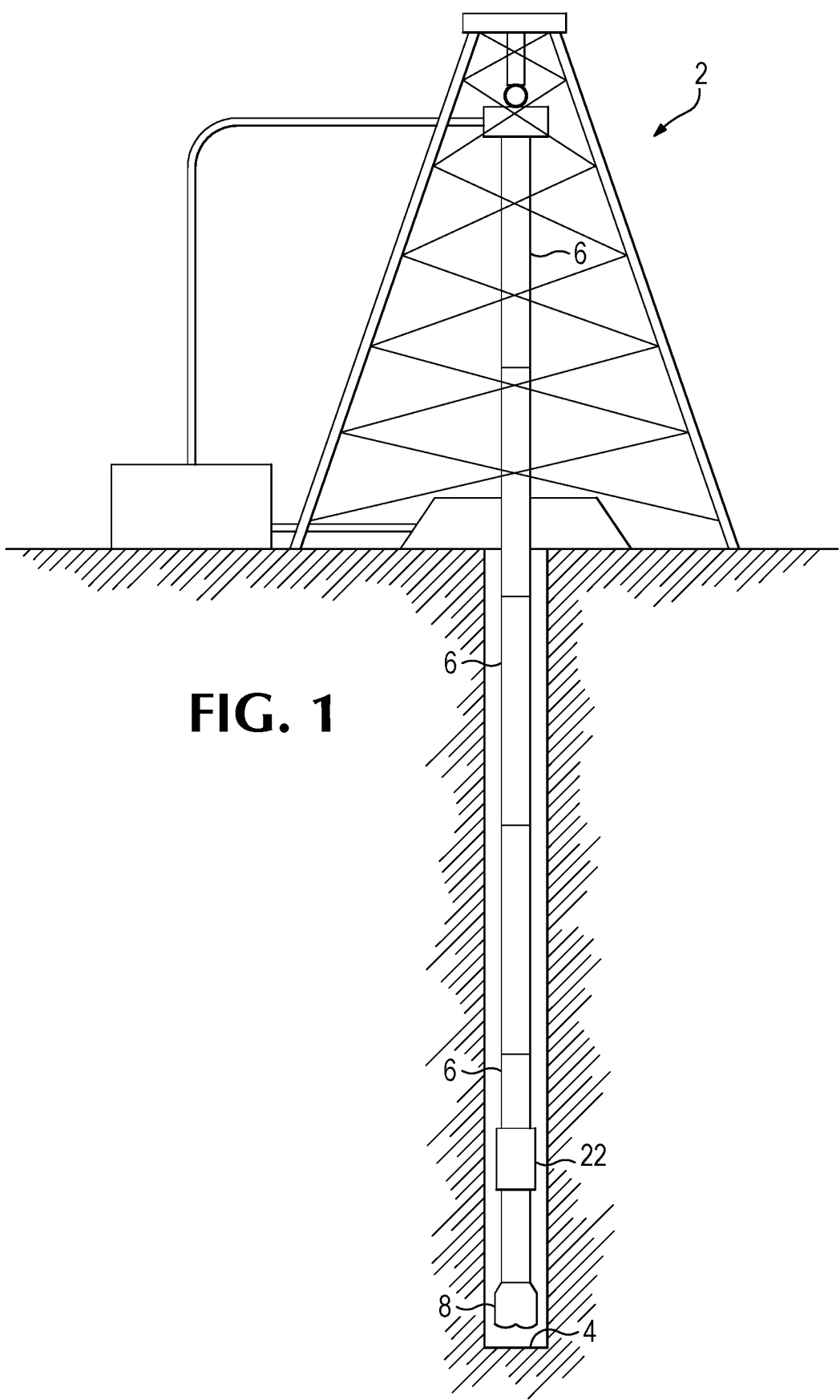
FIG. 1 is a schematic diagram of a drilling operation.
Figure 2:
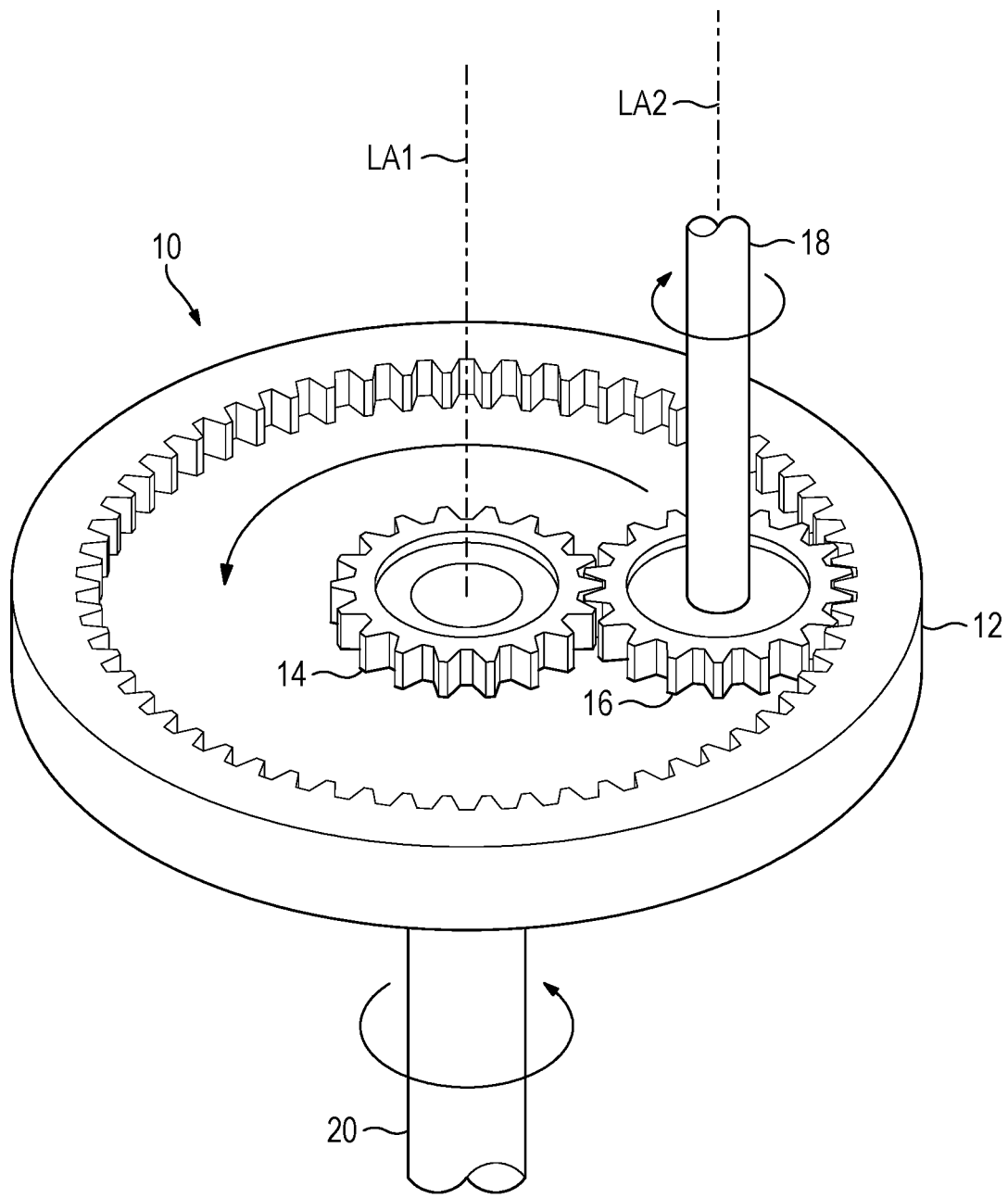
FIG. 2 is a perspective view of a universal joint in accordance with the present invention.
Figure 3:
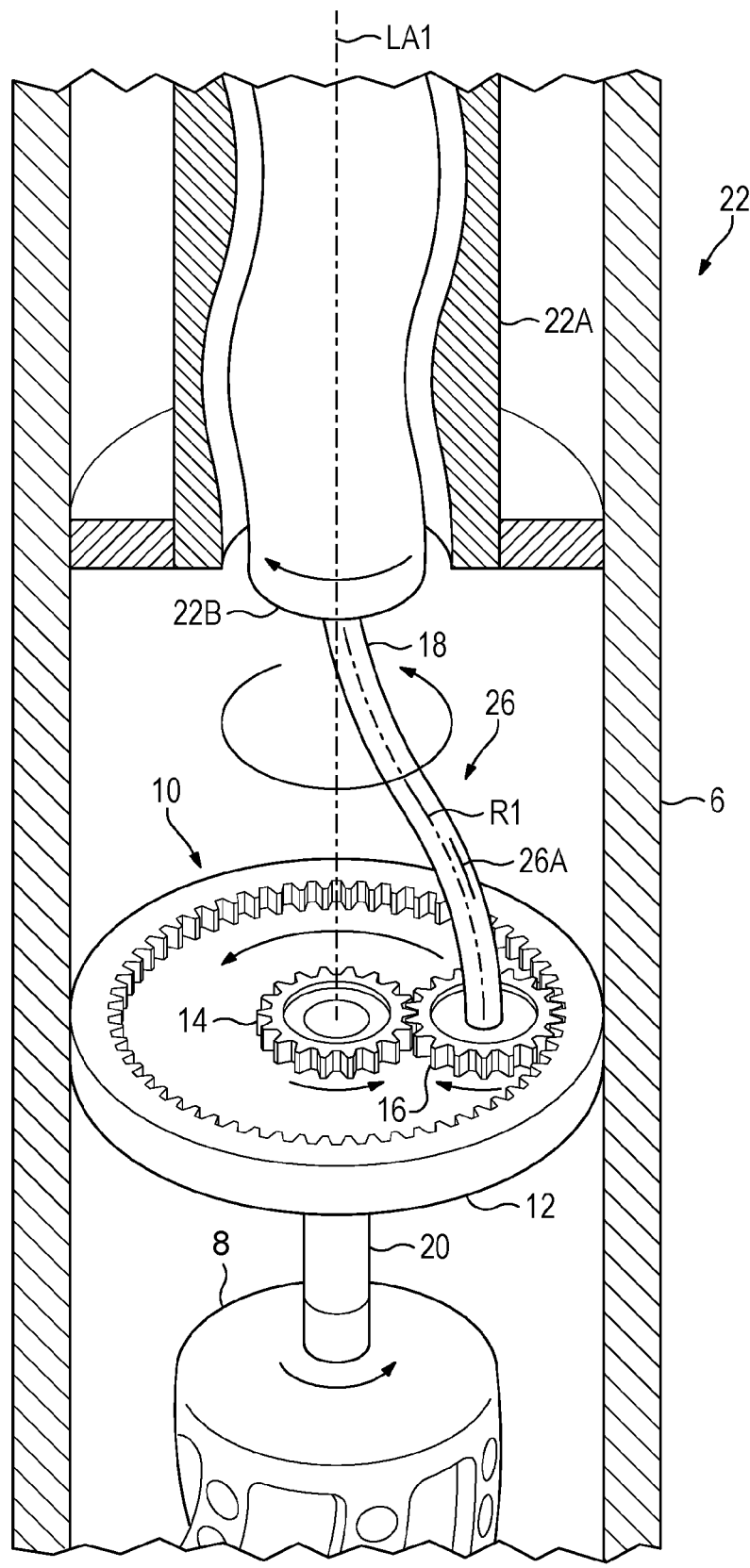
FIG. 3 is a cross section perspective view of a portion of a drill string with the universal joint.

A drill string in its basic form consists of sections of threaded pipe assembled end to end with a drill bit at a distal end for advancing a borehole. The drill string can be miles long and rotated at a proximal end of the pipe by a drilling rig to turn the drill bit and advance the borehole, Many kinds of tools can be included in the drill string to perform functions such as reaming out obstructions from the bore hole, vibrating the drill string, applying percussion to the bit, widening the borehole and rotating the drill bit.

In one example, a positive displacement motor or mud motor (PDM) can be installed near the drill bit to drive the drill bit instead of, or in addition to, driving the drill string from the above ground drill rig. Fluid is pumped down the drill string under pressure during operation to flush material out of the borehole. A mud motor uses the pressure of the fluid to drive the motor rotating an output shaft. The output of the motor is eccentric, with the output shaft rotating about a circle as well as rotating about the rotor axis. In order to limit the stress on the drill string and bit, this extraneous motion is converted to axial rotation.

The assembly of the present invention is shown in FIGS. 2-6. The assembly is compact, can transmit significant torque and can accommodate misalignment of transmitting and receiving elements.

The disclosed planetary gear assembly 10 includes a ring gear 12 fixed in relation to drill string 6, a sun or central gear 14 that rotates about a longitudinal axis LA1, and a planetary or medial gear 16 that engages the ring gear and sun gear. The planetary gear rotates about its own axis LA2 and also rotates eccentrically about the axis LA1. The planetary gear 16 is driven by shaft 18 mounted to the planetary gear. The sun gear has a shaft 20 mounted at its axis. Planetary gear systems are well known and understood by those skilled in the art.

In a typical downhole application, a mud motor 22 in a drill string is used to drive a bit 8. The mud motor includes a stator housing 22A fixed in relation to the drill string 6. Drilling fluid pumped down the drill string drives a rotor 22B in the stator. The stator generally has an offset rotation.

Shaft 18 is connected to rotor 22B. As a result shaft 18 rotates generally about its axis R1. The shaft rotates simultaneously about the axis LA1 in eccentric rotation or nutation. The actual motion of the drive shaft can include more complex motion in response to rotation of the rotor in the stator. The shaft 18 drives rotation of the planetary gear 16 by engagement of gear 16 with gear 12. Planetary gear 16 also rotates about its own axis and about axis LA1 similar to the drive shaft 18. The rotation of the planetary gear 16 in the fixed ring gear 12, while engaging the ring gear and the sun gear, drives the sun gear 14 to rotate. The planetary gear system 10 converts the eccentric rotation of the mud motor 22 and shaft 18 to axial rotation to drive the sun gear 14. Rotation of sun gear 14 drives shaft 20 and bit 8.

The planetary gear can be configured to drive a downstream tool at a higher speed or a lower speed than the rotational speed of rotor 228. Where sun gear 14 is smaller than planetary gear 16, the shaft 20 will rotate at a greater speed than shaft 18. Where sun gear 14 is larger than planetary gear 16, the shaft 20 will rotate at a slower speed than shaft 18. The teeth of each of the gears are of corresponding size to mesh efficiently. Gear size may be defined by the number of teeth on the gear. In some embodiments, the planetary gear assembly includes the sun gear and planetary gear, and the ring gear is omitted.

The sun gear, planetary gear and ring gear in some embodiments will be coplanar with the axes of each gear parallel. The shaft 18 can exhibit a complex motion coinciding with the rotation of the rotor 22B. As shown in in FIG. 4, the shaft 18 can be oriented to the planetary gear at an angle which can induce stress at the connection between planetary gear 16 and shaft 18. The planetary gear is shown in two opposite positions along its rotation with the shaft at different angles with the gear. This periodic motion produces cyclic stress which can result in fatigue failure of the planetary gear, the shaft or the connection between them.

Figure 4:
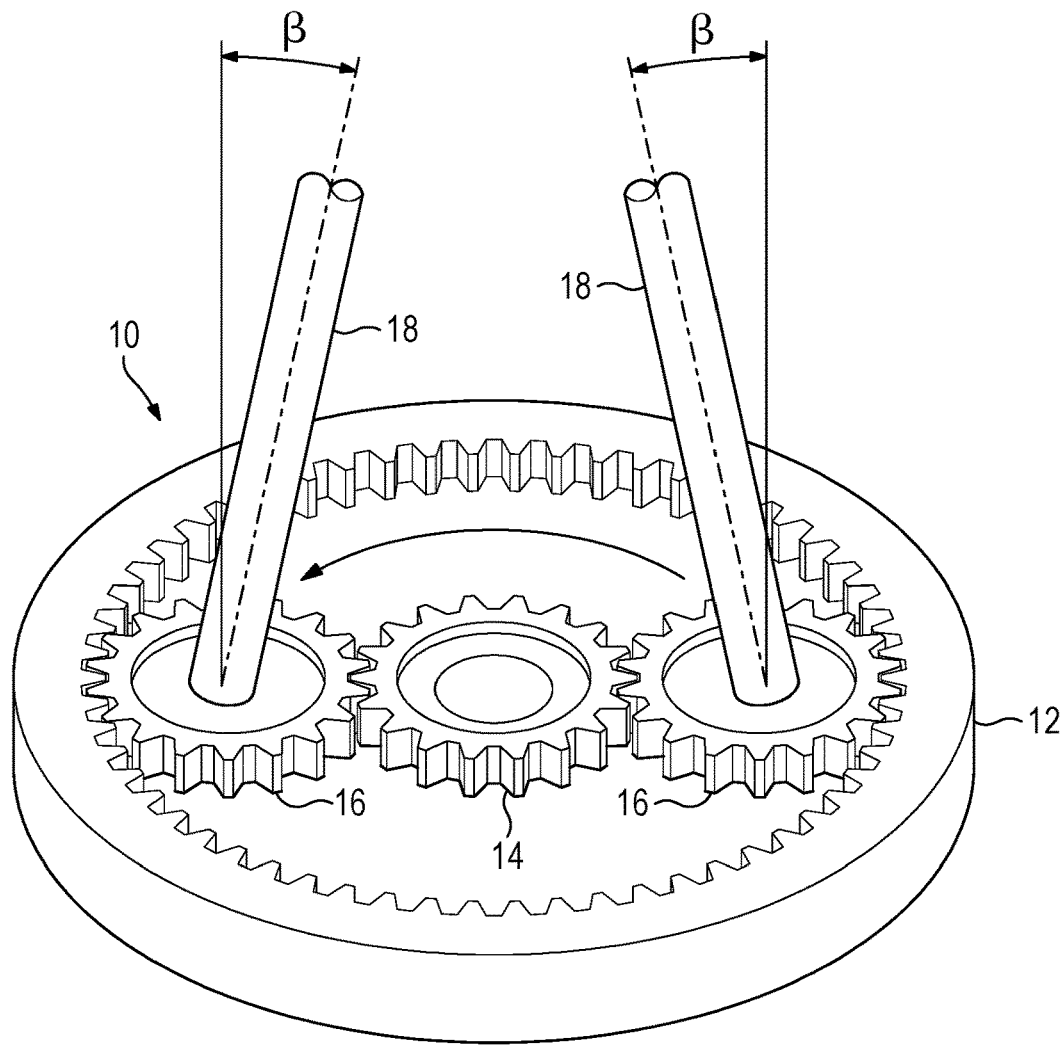
FIG. 4 is a perspective view of components of the universal joint
Figure 4A:
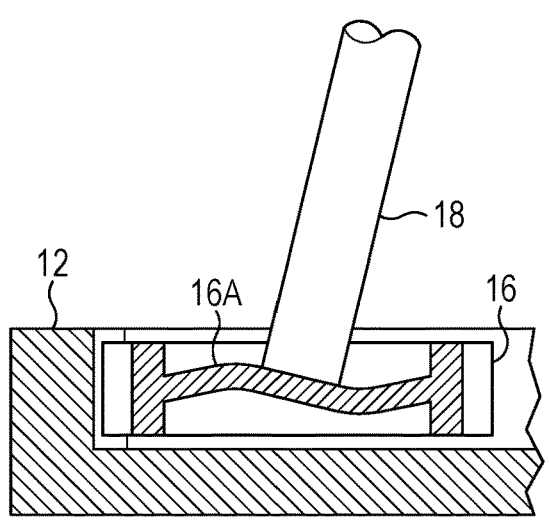
FIG. 4A is a cross section view of the planetary gear of the invention.

To accommodate this cyclic stress, planetary gear 16 can incorporate a flex disc. A flex disc can be made from one or more discs of metal, plastic or other flexible material. The shaft 18 can be fixed to the center of the disc and the edges of the disc are attached to the planetary gear. Alternatively, the shaft terminates in a set of arms and the disc has a central opening. Each arm is attached to the disc at radially spaced positions. Angular misalignment of the shaft and the gear is accommodated by flexing of the disc between the mount of the shaft and the gear body (FIG. 4A). As the shaft and gear rotate, the disc flexes in a sinusoidal fashion. This can limit stress at the connection to the disc. Other connection methods that connect the shaft to the planetary gear produce a similar result may be used.

Figure 4B:
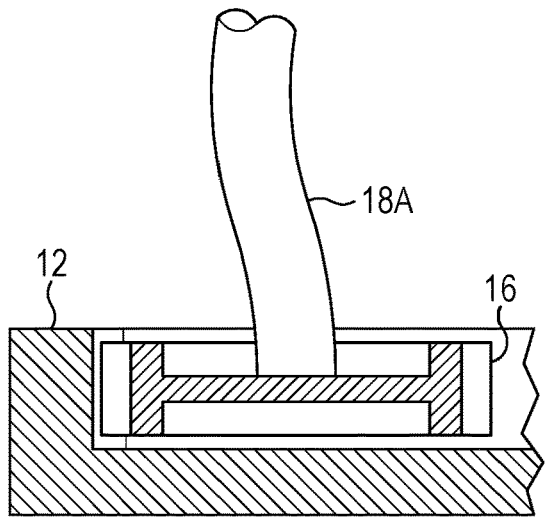
FIG. 4B is a cross section view of the planetary gear of another embodiment.

In another embodiment, the shaft is flexible and can be a flaccid line or cable 18A (FIG. 4B). The cable is attached to the rotor at one end and to the planetary gear at the other end. The cable can include one or more strands and carries torque between the rotor 22B and the planetary gear 16. The cable can flex to accommodate the eccentricity of the rotor rotation and maintain a perpendicular orientation to the plane of the gear assembly at the gear end of the cable without significant stress at the joint. Alternatively, the assembly can include a flexible disc 16A and a cable 18A. Alternatively, the assembly can include any flexible coupling at planetary gear 16.

Figure 5:
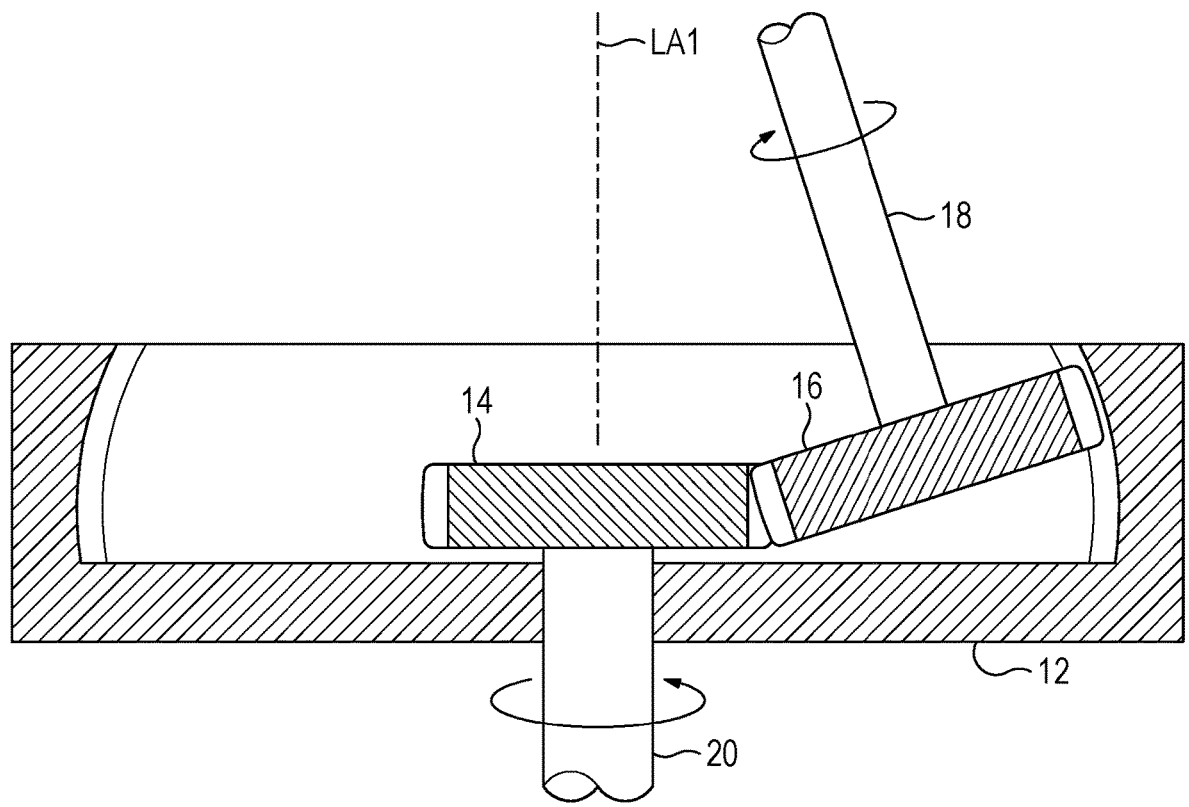
FIG. 5 is a cross section view of another embodiment of the invention.

In another embodiment, the planetary gear maintains a perpendicular orientation to shaft 18 and the gear is not limited to rotation in the plane of the sun gear 14 and ring gear 12. FIG. 5 shows a ring gear 12 with an inner toothed wall that is curved with a radius of curvature perpendicular to the axis LA1. The interface of the sun gear 14 and planetary gear 16 is similarly curved. In this embodiment the planetary gear is allowed to move out of the primary plane of the assembly and maintain positive engagement with both the ring gear and the sun gear. This limits stress on the planetary gear interface with the shaft.

Each of the gears can include teeth to engage the adjacent gear. Alternatively, the assembly can be configured without teeth. In such an embodiment, the gears exert adequate normal force on the adjacent gear so that friction limits slipping between the joining faces. The gear interfaces can incorporate resilient materials so the high normal force at the interfaces deflects the material and increases the surface area of the interface.

Figure 6:
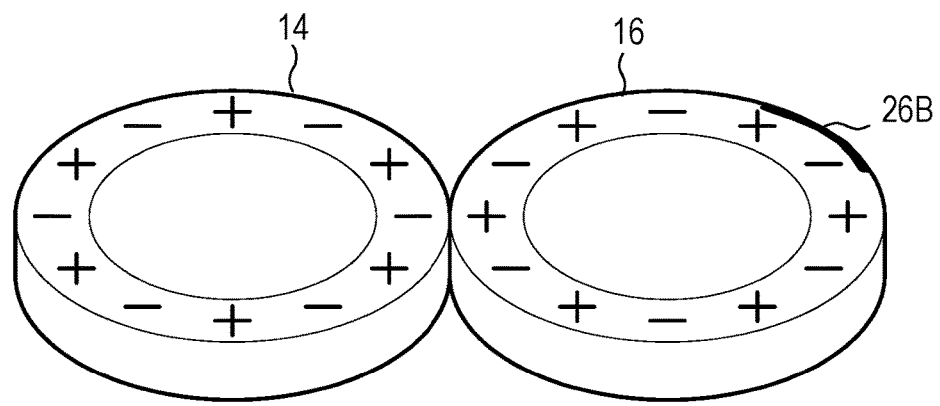
FIG. 6 is a schematic view of gears used in another embodiment of the invention.

Alternatively, the gears can incorporate magnets in lieu of (or in addition to) teeth. Magnets placed at the edge of the gear can be oriented with alternating positive and negative poles around the edge of the gear as shown in FIG. 6. When positioned adjacent another gear with outward facing alternating poles the magnets will align with a corresponding pole in the opposite gear and exert an attractive force. The gears will tend to maintain contact with a normal force proportional to the strength of the magnets. Rotation of one of the gears will induce rotation in the adjacent gear. This has the advantage of limiting sliding contact and erosion of the mating gear faces. The drill string can include a magnet or filter to separate and collect metal debris in the drilling fluid that could accumulate on the magnetic gears.

The planetary gear assembly 10 can include a service life indicator 26 (SLI) that displays a gauge of remaining service life for the component. The indicator can allow the operator to replace the universal joint before a downhole failure. Maters repeatedly flexed are subject to fatigue failure from hardening and can fracture. Contacting surfaces can wear and erode. In one embodiment, the service life indicator is a fatigue indicator. The fatigue indicator can be integrated with shaft 18. The fatigue indicator could be a strand or a coating incorporated with the shaft that flexes with the shaft in operation. The fatigue indicator 26A has a configuration or is a material selected to be more vulnerable to fatigue stress than the shaft.

For example, the fatigue indicator strand can be selected to have a service life 80% of the life of the shaft or cable. Reduced service life of the fatigue indicator may be a factor of the dimensions of the indicator, accelerated work hardening of the material or a harder material as compared to the balance of the shaft. At 80% of the service life, the wear indicator develops visible failure mechanisms such as thinning, cracking or other visible indicia that can be detected by the operator. The assembly can be removed from service in response to visual inspection of the fatigue indicator before the shaft fails.

Components of a drill string can be in contact with suspended particles of the drilling fluid that are abrasive and erode the components. In one embodiment, the service life indicator 26 is a wear or erosion indicator. The wear indicator can include a material layer 26B included on a gear. Erosion of the material layer to a critical thickness can be visually detected by the operator.

In some embodiments the service life indicator is inspected with a visual magnification, specific illumination such as ultraviolet light, ultrasonic testing, penetrant dye testing or other inspection methods. In some embodiments the service life indicator is a sensor that generates an electronic signal.

The planetary gear described here performs many of the functions of a universal joint but can convert eccentric rotation more efficiently to axial rotation and is more compact allowing a shorter working end of a drill string with better capability for steering the bit in the borehole than a conventional universal joint.

It should be appreciated that although selected embodiments of the representative planetary gear assemblies are disclosed herein, numerous variations of these embodiments may be envisioned by one of ordinary skill that do not deviate from the scope of the present disclosure. The disclosure set forth herein encompasses multiple distinct inventions with independent utility. The various features of the invention described above are preferably included in each universal joint. Nevertheless, the features can be used individually in a joint to obtain some benefits of the invention. While each of these inventions has been disclosed in its preferred form, the specific embodiments thereof as disclosed and illustrated herein are not to be considered in a limiting sense as numerous variations are possible. Each example defines an embodiment disclosed in the foregoing disclosure, but any one example does not necessarily encompass all features or combinations that may be eventually claimed.

The invention claimed is:

1. A universal joint for downhole applications comprising:
a first rotating component having an outer circumference, the first rotating component being rotatable around a first axis and moveable around a second axis; and
a second rotating component rotatable about the second axis and having an outer circumference engaging the outer circumference of the first rotating component as the first rotating component moves around the second axis, the second rotating component adapted for transmitting torque from a driving component to a driven component;
wherein the first rotating component is adapted for coupling with the driving component by a shaft when the driving component has an axis of rotation that moves eccentrically around the second axis, and wherein the shaft has a non-linear axis about which the shaft is rotatable.

2. The universal joint of claim 1, wherein the shaft flexes to compensate for misalignment of the driving component and the first rotating component.

3. The universal joint of claim 1, where the shaft comprises a cable.

4. The universal joint of claim 1 further comprising a service life indicator providing a gauge of wear, erosion, overstress and/or fatigue.

5. The universal joint of claim 1 where the first and second rotating component are coplanar during operation.

6. The universal joint of claim 1 where the first and second rotating components are gears.

7. The universal joint of claim 1, wherein the non-linear axis about which the shaft is rotatable extends from the driving component to the first rotating component.

8. A universal joint to transfer torque between downhole components includes:
a planetary gear, a sun gear having an axis of rotation, a first shaft connected at its proximal end to the planetary gear, and a second shaft connected to the sun gear, wherein a distal end of the first shaft is adapted for coupling with a driving component, wherein the first shaft has a non-linear axis about which the first shaft is rotatable, and wherein the driving component has an axis of rotation that moves eccentrically relative to the axis of rotation of the sun gear while engaging the planet gear.

9. The universal joint of claim 8 including a ring gear, where the ring gear engages the planetary gear to rotate the sun gear, and torque applied by a first drill string component to the planetary gear is transferred to the sun gear and a second drill string component.

10. The universal joint of claim 8 where the gears are generally coplanar to each other and are generally transverse to the axis of rotation of the driving component.

11. The universal joint of claim 8, where the first shaft comprises a flaccid cable.

12. A downhole tool assembly includes a positive displacement motor connected to a drill bit by a first gear engaging a second gear to transmit torque and convert eccentric rotation of the motor to axial rotation of the bit, wherein the first gear rotates about a first axis and the second gear rotates around a second axis, wherein the first gear moves eccentrically around the second gear, wherein the first gear is adapted for coupling with a driving component with an axis of rotation that moves eccentrically around the second axis, wherein the first gear is adapted for coupling with the driving component by a shaft that has a non-linear axis about which the shaft is rotatable.

13. The downhole tool assembly of claim 12 where the first gear engages the second gear at teeth around the circumference of each gear.

14. The downhole tool assembly of claim 12 including a ring gear that engages the first gear.

15. The downhole tool assembly of claim 12 where the tool includes a service life indicator.

16. The downhole tool assembly of claim 12 where the first gear engages the second gear by magnetic force.

17. The downhole tool assembly of claim 12 where the first gear is coplanar with the second gear during operation.

* * * * *